(12) United States Patent
Brokhman et al.

(10) Patent No.: US 9,612,957 B2
(45) Date of Patent: Apr. 4, 2017

(54) READ DISTURB AND DATA RETENTION HANDLING FOR NAND DEVICES

(71) Applicant: Qualcomm Innovation Center, Inc., San Diego, CA (US)

(72) Inventors: Tatyana Brokhman, Kiryat Ata (IL); Konstantin Dorfman, Haifa (IL)

(73) Assignee: Qualcomm Innovation Center, Inc., San Diego, CA (US)

( * ) Notice: Subject to any disclaimer, the term of this patent is extended or adjusted under 35 U.S.C. 154(b) by 0 days.

(21) Appl. No.: 14/668,890

(22) Filed: Mar. 25, 2015

(65) Prior Publication Data

US 2016/0034194 A1    Feb. 4, 2016

Related U.S. Application Data

(60) Provisional application No. 62/030,995, filed on Jul. 30, 2014.

(51) Int. Cl.
*G06F 13/00* (2006.01)
*G06F 3/06* (2006.01)
*G06F 12/02* (2006.01)

(52) U.S. Cl.
CPC ............... *G06F 12/0246* (2013.01)

(58) Field of Classification Search
CPC ................................................. G06F 12/0246
See application file for complete search history.

(56) References Cited

U.S. PATENT DOCUMENTS 7,818,525 B1 * 10/2010 Frost .................. G06F 12/0246
365/185.25
8,264,880 B1 * 9/2012 Yang .................. G11C 16/3418
365/185.04

* cited by examiner

*Primary Examiner* — Yong Choe
(74) *Attorney, Agent, or Firm* — Neugeboren O'Dowd PC

(57) ABSTRACT

Systems, methods, and apparatus are herein disclosed for reducing read disturb and data retention errors in FLASH memory devices designed for long lifespans, such as greater than 10 or 15 years. Read disturb errors can be reduced by maintaining a read counter stored in a volatile memory and a FASTMAP memory block of the FLASH memory. When the read counter meets a threshold, then the associated memory block can be scheduled for scrubbing. Data retentions errors can be reduced by maintaining a last-erase timestamp in metadata of each memory block of a FLASH memory. When the last-erase timestamp associated with a given memory block meets a threshold, then the memory block can be scheduled for scrubbing.

17 Claims, 5 Drawing Sheets

READ DISTURB AND DATA RETENTION HANDLING FOR NAND DEVICES

CROSS REFERENCE TO RELATED APPLICATIONS

The present application for patent claims priority to Provisional Application No. 62/030,995 entitled "READ DISTURB AND DATA RETENTION HANDLING FOR NAND DEVICES" filed Jul. 30, 2014, and assigned to the assignee hereof and hereby expressly incorporated by reference herein.

BACKGROUND

Field of the Disclosure

The present disclosure relates to computing devices. In particular, but not by way of limitation, the present invention relates to reducing errors and retaining data in NAND-based flash memory devices.

Description of Related Art

In general, a flash memory device is a type of memory device that can retain stored digital data, even when no power is being provided to the device. NAND flash memories are one type of flash memory and are one of the most common storage devices in present day embedded systems. The most common devices in which one can find raw NAND flash cards in are mobile phones.

One limitation of NAND flash memory is that the method used to read NAND flash memory can cause bit-flips of cells surrounding the cell being read resulting in uncorrectable errors (or ECC errors). These errors are known as read disturb errors. NAND flash memory also suffers from data retention errors, where data that is stored in rarely accessed blocks is prone to being lost, for example, via disturbance from the reading and writing of nearby memory blocks.

Existing LINUX NAND flash memory drivers do not address read disturb and data retention errors, or sidestep them via error correction, because the possibility of their occurrence is very low. However, the ability to ignore these errors only applies because previous NAND flash memory was only expected to and designed to have lifespans under five years. With the development of "long life NAND," devices having lifespans of 10-15 years, read disturb and data retention errors can no longer be ignored or dealt with via error correction alone. These devices are also being subject to higher temperatures, and the higher temperatures alone speed up read disturb and data retention errors. Thus in combination with the longer lifetimes of modern NAND devices, proper functioning requires these formerly ignored issued to be addressed.

Existing systems perform wear-leveling in order to address errors that can be caused by repeated erasing of memory blocks, but this is a different problem than read disturb and data retention errors, which result from a lack of erase operations. Wear-leveling systems typically include an erase counter and either perform scrubbing when the erase counter exceeds a threshold or when errors are observed. Thus, there is a need in the art to address errors caused by infrequent erase operations.

SUMMARY

One aspect of the disclosure is a FLASH memory device comprising a plurality of memory blocks, a FASTMAP memory block, a read counter module, a last-erase timestamp module, and a move and erase module. The plurality of memory blocks can each have a metadata section. The read counter module can include a counter module, a backup module, and a reset module. The counter module can increment a read counter value when a read operation is performed on a one of the plurality of memory blocks. The backup module can periodically copy the read counter value to the FASTMAP memory block. The reset module can reset the read counter value when an erase operation is performed on the one of the memory blocks. The last-erase timestamp module can update a last-erase timestamp in a metadata section of the one of the memory blocks every time that an erase operation is performed on the one of the memory blocks. The move and erase module can include a read counter and a last-erase timestamp scrubbing scheduler. The read counter scrubbing scheduler can schedule data stored in the one of the memory blocks to be moved and then the one of the memory blocks to be erased when the read counter reaches a first threshold. The last-erase timestamp scrubbing scheduler can schedule data stored in the one of the memory blocks to be moved and then the one of the memory blocks to be erased when the last-erase timestamp exceeds a second threshold.

Another aspect of the disclosure is a method that can include incrementing a read counter every time that a read operation is performed on a memory block of a FLASH memory. The method can include incrementing a read counter every time that a read operation is performed on a memory block of a FLASH memory. The method can also include periodically making a copy of the read counter in a FASTMAP block of the FLASH memory. The method can further include resetting the read counter when an erase operation is performed on the memory block. The method can yet further include updating a last-erase timestamp whenever the memory block is erased. The updating can occur in a metadata of the memory block of the FLASH memory. The method further can include scheduling the memory lock for a move and erase operation when either: the read counter reaches a read count threshold, or the last-erase timestamp reaches a last-erase threshold.

Yet another aspect of the disclosure is a non-transitory, tangible computer readable storage medium, encoded with processor readable instructions to perform a method for reducing read disturb and data retention errors in FLASH memory. The method can include incrementing a read counter every time that a read operation is performed on a memory block of a FLASH memory. The method can further include periodically making a copy of the read counter in a FASTMAP block of the FLASH memory. The method can further include resetting the read counter when an erase operation is performed on the memory block. The method can yet further include updating a last-erase timestamp whenever the memory block is erased. The updating can occur in a metadata of the memory block of the FLASH memory. The method further can include scheduling the memory lock for a move and erase operation when either: the read counter reaches a read count threshold, or the last-erase timestamp reaches a last-erase threshold.

Yet a further aspect of the disclosure is a system including means for incrementing a read counter every time that a read operation is performed on a memory block of a FLASH memory. The system can also include means for periodically making a copy of the read counter in a FASTMAP block of the FLASH memory. The system can also include means for resetting the read counter when an erase operation is performed on the memory block. The system can further include means for updating a last-erase timestamp whenever the memory block is erased, the updating occurring in a metadata of the memory block of the FLASH memory. The system can yet further include means for scheduling the memory block for a move and erase operation when either: the read counter reaches a read count threshold, or the last-erase timestamp reaches a last-erase threshold.

DETAILED DESCRIPTION

Figure 1:
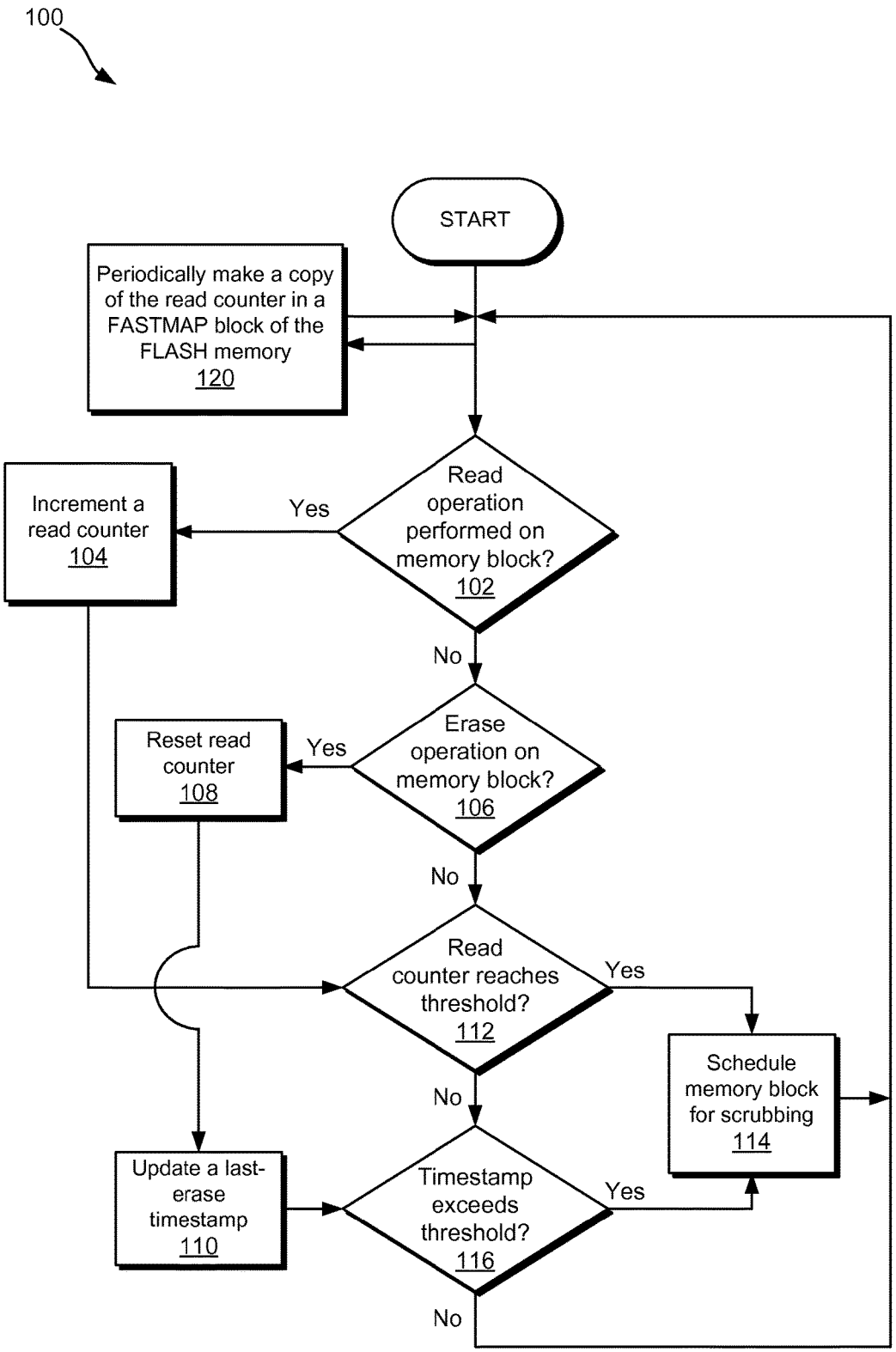
FIG. 1 illustrates a method of reducing read disturb and data retention errors in a FLASH memory device.

For the purposes of this disclosure, a PEB, or physical erase block, is a logical fragment of a FLASH memory.

For the purposes of this disclosure, scrubbing means to copy a memory block, write it to a new memory block location, and then erase the original memory block once copying is complete.

For the purposes of this disclosure, the FASTMAP is an optional FLASH memory block comprising information previously created in memory by scanning the entire FLASH device. The FASTMAP includes metadata used to access, read, and write to other memory blocks of a FLASH memory, for instance a list of physical erase blocks (PEBs) and their states (e.g., if a memory block is free or corrupted), a list of volumes, and erase counter values. The lists of PEBs and volumes can also include mapping information. If enabled, upon bootup, a mapping of FLASH memory is generated and this mapping can be stored in the FASTMAP memory block. On subsequent boot ups, a mapping of the FLASH memory can be obtained by reading the FASTMAP memory block—a much faster process than creating this mapping via a reading of data in the metadata of each memory block.

For the purposes of this disclosure, an unsorted block image (UBI) layer is part of a driver for FLASH memory. The UBI layer manages unmanaged NAND and can reside below the file system, but above the memory technology device (MTD) layer. The UBI layer can manage wear-leveling across a flash chip and implement transparent I/O error handling. For instance, the UBI layer can perform scrubbing, or the movement of data from physical erase-blocks which have bit-slips to other physical eraseblocks.

For the purposes of this disclosure, a user is a developer and writes applications that use the FLASH memory herein disclosed. The user is therefore not an end user who uses computing devices that implement the applications written by the developer.

This disclosure enables reliable long-term FLASH memory devices (e.g., having low read disturb and read retention errors for 10-15 years) by performing additional scrubbing as compared to the prior art. In particular, to handle read disturb errors, systems, methods, and apparatus are disclosed that increment a read counter every time that a read operation is performed on a memory block of a FLASH memory (or a physical erase block), and resetting the read counter when an erase operation is performed on the memory block. Further, the memory block can be scheduled for scrubbing (e.g., a move and erase operation) when the read counter reaches a first threshold (e.g., a read count threshold). This can involve adding the memory block to a pending scrub list. The read counter can be stored in a volatile memory, such as RAM, of a computing device on which the FLASH memory is coupled to. A copy of the read counter can be periodically made and the copy stored in a FASTMAP block of the FLASH memory. In this way, if a reboot is required or power is lost to the FLASH memory, upon restart, the copy of the read counter can be recovered from the FASTMAP memory block.

To handle read retention errors, systems, methods, and apparatus are disclosed that update a last-erase timestamp whenever the memory block is erased. This last-erase timestamp can be stored in metadata of the memory block. When the last-erase timestamp reaches a time since a last-erase threshold, the memory block can be scheduled for scrubbing, for instance including adding the memory block to the pending scrub list.

Each memory block can include metadata, which often contains a mapping of the memory block that a memory controller uses to read, write, and access data within the memory block. To modify the metadata, the entire memory block must be erased and then rewritten with the modification. This is a byproduct of the way FLASH memory works—to change even a single bit, an entire memory block in which the bit exists must be cleared or erased and then rewritten. Reading operations do not require erasing of the memory block. As a result of this need to erase and rewrite in order to make modifications, it is convenient to update the last-erase timestamp within the metadata whenever an erase operation occurs. However, for an update to the read counter, no erasing of the memory block is otherwise occurring, and thus an update to a read counter that is stored in metadata would require and erase and writing of the entire memory block. To avoid the inconvenience, delay, and excess erase/writing operations associated with saving a read counter in metadata, the read counter is instead stored in volatile memory such as the RAM of a computing device coupled to the FLASH memory. In this way, the read counter can be updated without requiring an erase and write operation to the memory block. A downside to saving the read counter in a volatile memory, something that is not a problem with the last-erase timestamp saved to metadata, is that a reboot of the system, power loss, etc. erases the volatile memory, which could cause a loss of the read counter. To counteract this threat, a copy of the read counter in the volatile memory can be periodically copied to non-volatile memory, and in particular to the FLASH memory. There is one portion of the FLASH memory that is often used to store mappings of the FLASH memory and other data that is often updated and thus the concerns of erasing and writing to a memory block are not as concerning. This is the FASTMAP memory block. Hence, a copy of the read counter can be periodically copied to the FASTMAP memory block, and in this way, if the read counter in the volatile memory is lost, then the read counter can be recovered from the copy residing in the FASTMAP memory block.

There are situations where the FASTMAP data can become invalid, and in such cases a default value can be used to recover the read counter. In one embodiment, this default value can be an average of erase counters for all memory blocks on the FLASH memory, where erase counters are maintained in metadata of each memory block and are incremented every time that an erase operation on the associated memory block occurs. The erase counter can be accessed after a system reboot and even where the FASTMAP data is invalid.

Comparisons of the read counter and the last-erase timestamp to thresholds can occur at different times and due to different triggers. For instance, comparison of the read counter to the first threshold may occur every time that a read operation occurs and/or every time that a write operation occurs. Alternatively, the comparison can also occur every time that a read operation is performed to the memory block and every time that a write operation is performed to the memory block. For the last-erase timestamp, the comparison can periodically or otherwise occur when a user-space application elects to initiate the comparison. The comparison can also occur whenever a read/write operation to the kernel occurs. In other words, the last-erase timestamp can be compared to thresholds (or verified) every time that the memory block is accessed (either via read or write operations or when triggered from user-space). The user-space application or a kernel space module can perform the analysis by looking at the last-erase timestamps for a plurality of memory blocks (or all memory blocks). In an embodiment, the analysis can be performed every few months, or every four months.

The pending scrub lists can be handled by an unsorted block images (UBI) layer wear leveling (WL) sub-system and can be handled by a background thread. In an embodiment, a NAND integrity component may utilize the WL sub-system to handle wear-leveling blocks and can perform scrubbing (move and erase operations) in the background. In some embodiment, the WL sub-system performs one work from the pending work list. In addition to one pending work from the thread, it will also scrub one pending memory block from the "pending scrub" list. Optionally, the WL background thread functionality may be extended to enable the operation mode of the background thread to be set to a passive mode, an aggressive mode, or a blocking mode. In the passive mode, each cycle performs one work from the pending works list and scrubs one memory block from the "pending scrub" list. In the aggressive mode, each cycle performs one work from the pending works list and scrubs X memory blocks from the "pending scrub" list, wherein X may be defined by the user. In the blocking mode, each cycle performs one work from the pending works list and scrubs all memory blocks from the "pending scrub" list. The operation modes described above may be set from user space via "sysfs".

Figure 2:
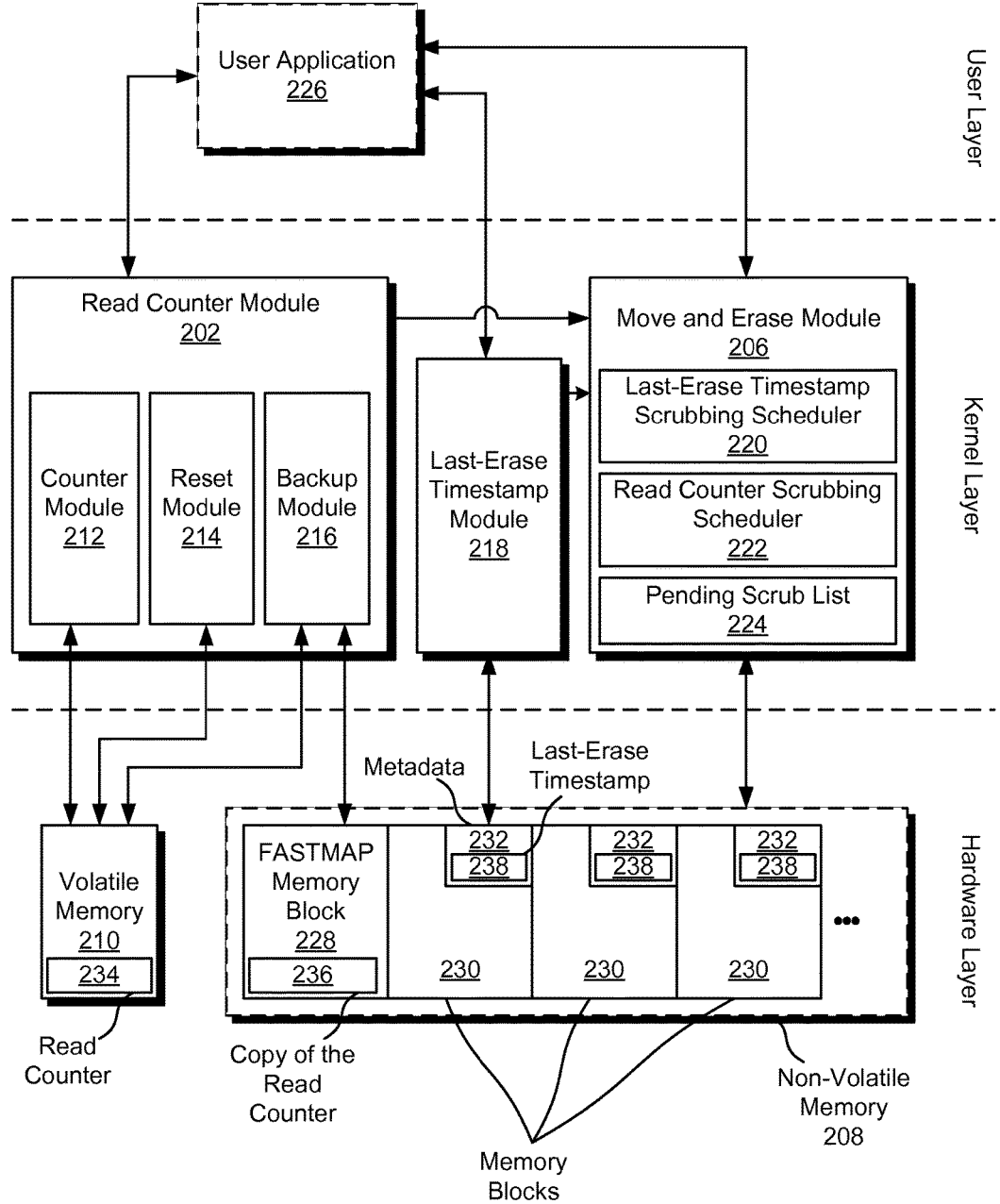
FIG. 2 illustrates a system for reducing read disturb and data retention errors in FLASH memory.

FIG. 2 illustrates a system for reducing read disturb and data retention errors in FLASH memory. A FLASH memory device, such as a memory stick, SIM card, or an embedded memory device, can be in communication with or coupled to a read/write device, such as a smartphone, tablet computer, or desktop computer, to name a few non-limiting examples. In particular, the FLASH memory device can include a non-volatile memory 208 at a hardware layer, in communication with a read counter module 202, a last-erase timestamp module 218, and a move and erase module 206 (i.e., a scrubbing module)—all three at a kernel layer. The read counter module 202 can be in communication with a volatile memory 210 at the hardware layer. An optional user application 226, at a user layer, can be in communication with the read counter module 202, the last-erase timestamp module 218, and the move and erase module 206. The non-volatile memory 208 can include a plurality of memory blocks 230, each having a metadata section 232. The non-volatile memory 208 can also include a FASTMAP memory block 228. The read counter module 202 can include a counter module 212, a reset module 214, and a backup module 216. The move and erase module 206 can include a last-erase timestamp scrubbing scheduler 220, a read counter scrubbing scheduler 222, and a pending scrub list 224. The read counter module 202 can be in communication with the move and erase module 206, and the last-erase timestamp module 218 can be in communication with the move and erase module 206.

In order to address read disturb errors, the counter module 212 can maintain a read counter value for each of the memory blocks 230 that tracks a number of times that each memory block 230 has seen a read operation since a last-erase operation. In an embodiment, the counter module 212 can increment a read counter value when a read operation is performed on one of the plurality of memory blocks 230. The read counter 234 can be stored in a volatile memory 210 of the hardware layer. Random access memory (RAM) is one non-limiting example of the volatile memory 210. Storing the read counter 234 in the volatile memory 210 allows the read counter 234 to be updated every time a read operation occurs without having to perform an erase and write operation in the memory blocks 230, which would be required were the read counter 234 stored in the memory blocks 230, for instance, in the metadata sections 232 of the memory blocks 230.

Since the volatile memory 210 can lose its data when power to a device comprising the volatile memory 210 occurs, or when the device reboots (e.g., is powered down and then powered up at a later time), the backup module 216 can store a copy of the read counter 234 in a form of non-volatile memory so that the read counter 234 can be recovered should the read counter 234 on the volatile memory 210 be lost. Corruption of the read counter 234 is another motivation for making a copy of the read counter 234. In an embodiment, the copy of the read counter 236 can be stored in the FASTMAP memory block 228 of the non-volatile memory 208. Since the FASTMAP memory block 228 is often modified (i.e., erased and rewritten), there is little disadvantage to storing a copy of the read counter 234 in the FASTMAP memory block 228, whereas there would be if the read counter 234 were stored in the metadata section 232 of a given memory block 230 (where an erase and write do not occur for every read operation).

Since the read counter 234 only needs to count read operations since a last-erase operation, the reset module 214 can reset the read counter 234 whenever a read operation is performed on the memory block 230 associated with the read counter 234. The reset module 214 can also reset the copy of the read counter 236 in the FASTMAP memory block 228.

The move and erase module 206 can monitor the read counter 234 and determine when the read counter 234 (or the copy of the read counter 236 is not available) meets or exceeds a first threshold (i.e., a number of read operations). When this first threshold is met, the read counter scrubbing scheduler 222 schedules the memory block 230 associated with the read counter 234 for scrubbing, for instance, by adding the memory block 230, or an identifier of the memory block, to the pending scrub list 224.

In order to address data retention errors, the last-erase timestamp module 218 can write a last-erase timestamp 238 to the metadata section 232 of an associated memory block 230 whenever an erase operation is performed on the associated memory block 230. Since the erase operation that triggers the update to the last-erase timestamp 238 involves an erase of the entire associated memory block 230, there is no disadvantage to updating the metadata section 232 at the same time. In other words, since an erase operation is typically followed by a write operation, a new value for the last-erase timestamp 238 can be written to the metadata section 232.

The move and erase module 206 can monitor the last-erase timestamp 238 and determine when the last-erase timestamp 238 meets or exceeds a second threshold (e.g., a last-erase threshold). When this second threshold is met, the last-erase timestamp scrubbing scheduler 220 schedules the memory block 230 associated with the last-erase timestamp 238 for scrubbing, for instance, by adding the memory block 230 to the pending scrub list 224. In an embodiment, determining whether the second threshold is met involves determining whether a sum of the last-erase timestamp and an erase time limit is less than a current time.

The monitoring by the move and erase module 206 can be carried out periodically, for instance, when initiated by an optional user application 226 at the user layer. The optional user application 226 can reside and operate on a read/write device coupled to the non-volatile memory 208, or on a FLASH device comprising the non-volatile memory 208, to name two non-limiting examples. The period of monitoring can be months, for instance four months. While the optional user application 226 is illustrated at a user layer, in alternative embodiments, monitoring of the last-erase timestamp 238 can be performed by other components operating at the kernel layer.

Implementations of components for performing scrubbing of those memory blocks in the pending scrub list 224 are not illustrated, although use of a wear-leveling module running in the background is one non-limiting example.

Figure 3:
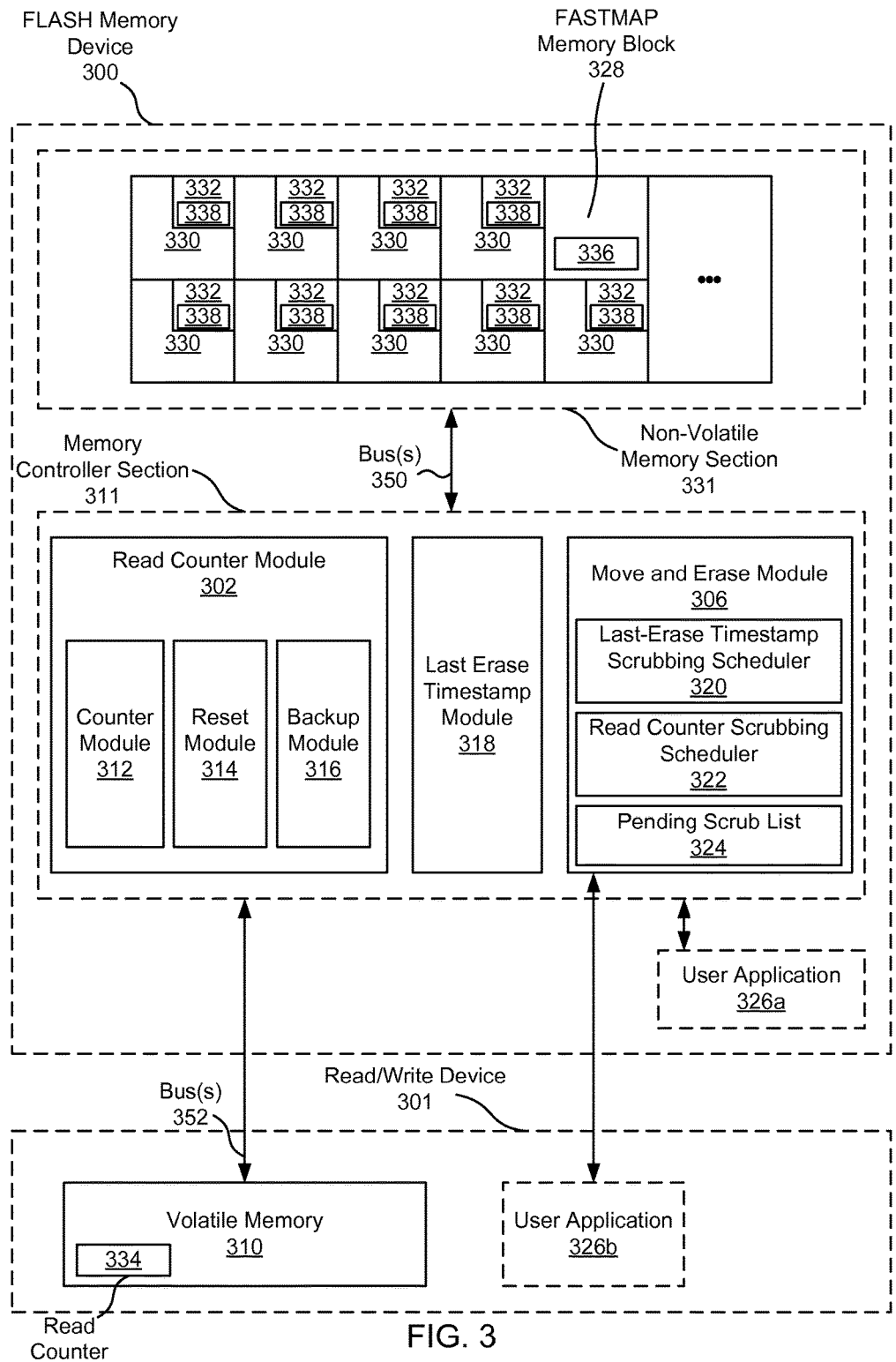
FIG. 3 illustrates another system for reducing read disturb and data retention errors in FLASH memory.

FIG. 3 illustrates another system for reducing read disturb and data retention errors in FLASH memory. A FLASH memory device 300, such as a memory stick, SIM card, or an embedded memory device, can be in communication with or coupled to a read/write device 301, such as a smartphone, tablet computer, or desktop computer, to name a few non-limiting examples. The read/write device 301 can communicate with the FLASH memory device 300 via a one or more external buses 352. In particular, the memory controller section 311 of the FLASH memory device 300 can communicate with a volatile memory 310 of the read/write device 301 via one or more external buses 352. The FLASH memory device 300 can include a non-volatile memory section 331 and a memory controller section 311 in communication with each other via one or more internal buses 350. The non-volatile memory section 331 can include a plurality of memory blocks 330, each having a metadata section 332. The non-volatile memory section 331 can also include a FASTMAP memory block 328. The memory controller section 311 can include a read counter module 302, a last-erase timestamp module 318, and a move and erase module 306 (i.e., a scrubbing module). The read counter module 302 can include a counter module 312, a reset module 314, and a backup module 316. The move and erase module 306 can include a last-erase timestamp scrubbing scheduler 320, a read counter scrubbing scheduler 322, and a pending scrub list 324.

In order to address read disturb errors, the counter module 312 can maintain a read counter value for each of the memory blocks 330 that tracks a number of times that each memory block 330 has seen a read operation since a last-erase operation. In an embodiment, the counter module 312 can increment a read counter value when a read operation is performed on one of the plurality of memory blocks 330.

The read counter 334 can be stored in a volatile memory 310 of the read/write device 301. Random access memory (RAM) is one non-limiting example of the volatile memory 310. Storing the read counter 334 in the volatile memory 310 allows a value to be updated every time a read operation occurs without having to perform an erase and write operation in the FLASH memory device 300, which would be required were the read counter 334 stored in the memory blocks 330, for instance, in a metadata section 332 of one of the memory blocks 330.

Since the volatile memory 310 loses all data when power to the read/write device 301 is lost or when the read/write device 301 is rebooted (e.g., powered down and then powered up at a later time), the backup module 316 can store a copy of the read counter 334 in a form of non-volatile memory so that the read counter 334 can be recovered should the read counter 334 on the volatile memory 310 be lost. Corruption of the read counter 334 is another motivation for making a copy of the read counter 334. In an embodiment, the copy of the read counter 336 can be stored in the FASTMAP memory block 328 of the non-volatile memory section 331 of the FLASH memory device 300. Since the FASTMAP memory block 328 is often modified (i.e., erased and rewritten), there is little disadvantage to storing a copy of the read counter 334 in the FASTMAP memory block 328, whereas there would be if the read counter 334 were stored in the metadata section 332 of a given memory block 330 (where an erase and write do not occur for every read operation).

Since the read counter 334 only needs to count read operations since a last-erase operation, the reset module 314 can reset the read counter 334 whenever a read operation is performed on the memory block 330 associated with the read counter 334. The reset module 314 can also reset the copy of the read counter 336 in the FASTMAP memory block 328.

The move and erase module 306 can monitor the read counter 334 and determine when the read counter 334 (or the copy of the read counter 336 is not available) meets or exceeds a first threshold (i.e., a number of read operations). When this first threshold is met, the read counter scrubbing scheduler 322 schedules the memory block 330 associated with the read counter 334 for scrubbing, for instance, by adding the memory block 330, or an identifier of the memory block, to the pending scrub list 324.

In order to address data retention errors, the last-erase timestamp module 318 can write a last-erase timestamp 338 to the metadata section 332 of an associated memory block 330 whenever an erase operation is performed on the associated memory block 330. Since the erase operation that triggers the update to the last-erase timestamp 338 involves an erase of the entire associated memory block 330, there is no disadvantage to updating the metadata section 332 at the same time. In other words, since an erase operation is typically followed by a write operation, a new value for the last-erase timestamp 338 can be written to the metadata section 332.

The move and erase module 306 can monitor the last-erase timestamp 338 and determine when the last-erase timestamp 338 meets or exceeds a second threshold (e.g., a last-erase threshold). When this second threshold is met, the last-erase timestamp scrubbing scheduler 320 schedules the memory block 330 associated with the last-erase timestamp 338 for scrubbing, for instance, by adding the memory block 330 to the pending scrub list 324. In an embodiment, determining whether the second threshold is met involves determining whether a sum of the last-erase timestamp and an erase time limit is less than a current time.

The monitoring by the move and erase module 306 can be carried out periodically, for instance, when initiated by an optional user application 326a on the FLASH memory device 300 or by an optional user application 326b on the read/write device 301. In an embodiment, this period can be a few months, for instance, four months. In other embodiments, monitoring of the last-erase timestamp 338 can be triggered and performed at a kernel level.

Implementations of components for performing scrubbing of those memory blocks in the pending scrub list 324 are not illustrated, although use of a wear-leveling module running in the background is one non-limiting example.

FIG. 1 illustrates a method of reducing read disturb and data retention errors in a FLASH memory device. In particular, the FLASH memory device can be a long-life NAND device, such as those design to have lifespans long enough that read disturb and data retention errors cannot be ignored (e.g., 10-15 years). The method 100 includes incrementing a read counter (Block 104) every time that a read operation is performed (Decision 102) on a memory block of a FLASH memory. The method 100 further includes scheduling the memory block associated with the read counter for scrubbing (or a move and erase operation) (Block 114) if the read counter reaches a read count threshold (Decision 112). Periodically, a copy of the read counter can be made in a FASTMAP block of the FLASH memory (Block 120). Further, the read counter can be reset (Block 108) when an erase operation is performed (Decision 106) on the memory block. A last-erase timestamp can be updated (Block 110) whenever the memory block is erased (Decision 106). This update can occur in a metadata of the memory block of the FLASH memory. If the last-erase timestamp exceeds a last-erase threshold (Decision 116), then the method 100 can schedule the memory block for scrubbing (Block 114). Once a memory block is scheduled for scrubbing (Block 114), the method 100 can restart. Additionally, the method 100 loops until one of the following occurs: a read operation is performed on a memory block (Decision 102), an erase operation is performed on the memory block (Decision 106), the read counter reaches the read count threshold (Decision 112), or the timestamp exceeds the last-erase threshold (Decision 116).

Figure 4:
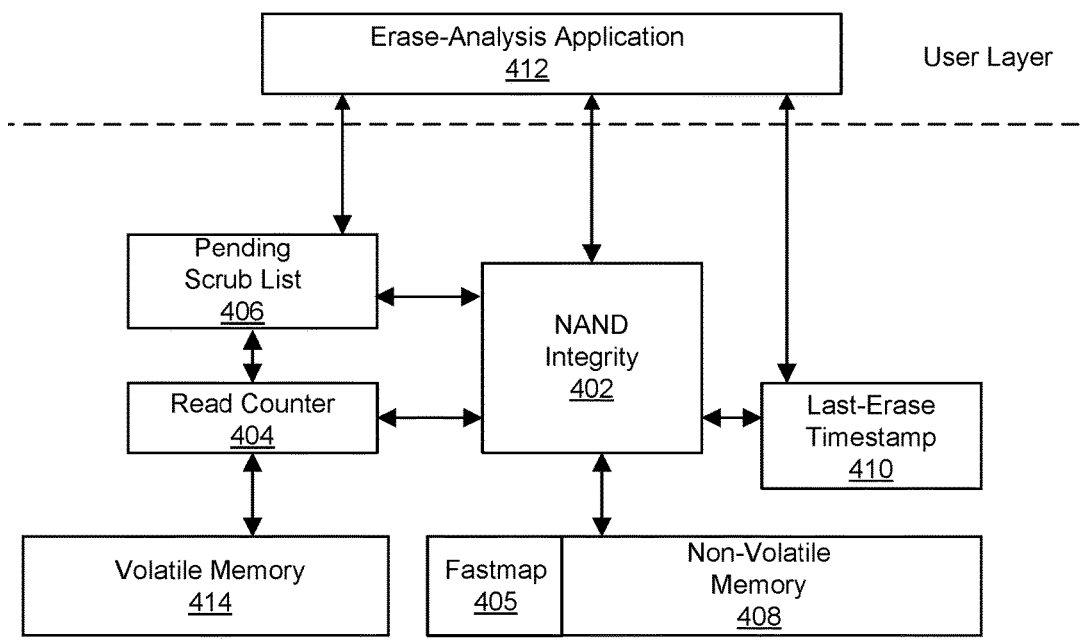
FIG. 4 illustrates another system for reducing read disturb and data retention errors in FLASH memory.

FIG. 4 illustrates another system for reducing read disturb and data retention errors in FLASH memory. The embodiment shown in FIG. 4, includes a NAND integrity component 402 that addresses the read disturb and data retention issues described above. The handling of both of the above-described types of blocks (read disturb and data retention) can be performed by scrubbing, which includes copying data from a first block to a second block, and then erasing the first block.

With respect to read disturb blocks, a read counter 404 can be maintained for each memory block (e.g., a physical erase block (PEB)) of a non-volatile memory 408. The read counter 404 can be incremented with each read operation of a memory block, and the read counter 404 can be reset with every erase operation. The read counter 404 can be verified during each read operation, and if the read counter 404 meets or exceeds a read count threshold, then the memory block can be added to a pending scrub list 406. Since the read counter 404 is preferably saved in volatile memory 414, such as RAM, it will not be valid after power up of the device (e.g., rebooting or loss of power). In order to overcome this issue and save the read counter 404, the read counter 404 can be saved as part of the FASTMAP memory block 405 of the non-volatile memory (e.g., NAND memory). In the event that the FASTMAP memory block 405 is found invalid, a default value will be assigned to the read counter 404 associated with each memory block of the non-volatile memory 408. The default value for the read counter 404 can be calculated according to an average erase counter for the memory blocks of the non-volatile memory 408. The erase counter can be saved in a metadata of the non-volatile memory 408 for each memory block. Since the erase counter is stored in non-volatile memory 408, it can remain valid even where the FASTMAP memory block 405 is lost.

With respect to data retention, a last-erase timestamp 410 can be maintained for each memory block of the non-volatile memory 408, and this value can be updated whenever a corresponding memory block is erased. An optional user-space erase-analysis application 412 can be periodically activated to analyze the last-erase timestamp 410 for each memory block and compare this value against a predefined threshold such as an erase limit. In an embodiment, if a last-erase time stamp+an erase time limit is less than a current time, then the block can be added to the pending scrub list 406. The pending scrub list can be handled by a UBI layer wear leveling (WL) sub-system background thread.

The NAND integrity component 402 can utilize the WL background thread to handle wear-leveling of memory blocks as well as to perform erase and scrub operations in the background. In some embodiments, the WL background thread performs one work from a pending works list. In addition to one pending work, the thread will also scrub one pending memory block from the pending scrub list 406. Optionally, the WL background thread functionality may be extended to enable the user to select one of three modes for handling of the pending scrub list 406: (1) a passive mode; (2) an aggressive mode; or (3) a blocking mode. In the passive mode, each cycle performs one work from the pending works list and scrubs one memory block from the pending scrub list 406. In the aggressive mode, each cycle performs one work from the pending works list and scrubs an X number of memory blocks from the pending scrub list 406, where X may be defined by the user. In the blocking mode, each cycle performs one work from the pending works list and scrubs all memory blocks from the pending scrub list 406. The operation modes described above may be set from userspace via sysfs. In other words, the modes allow a user to select the priority for scrubbing memory blocks from the pending scrub list 406 as compared to scrubbing memory blocks on the pending works list.

Figure 5:
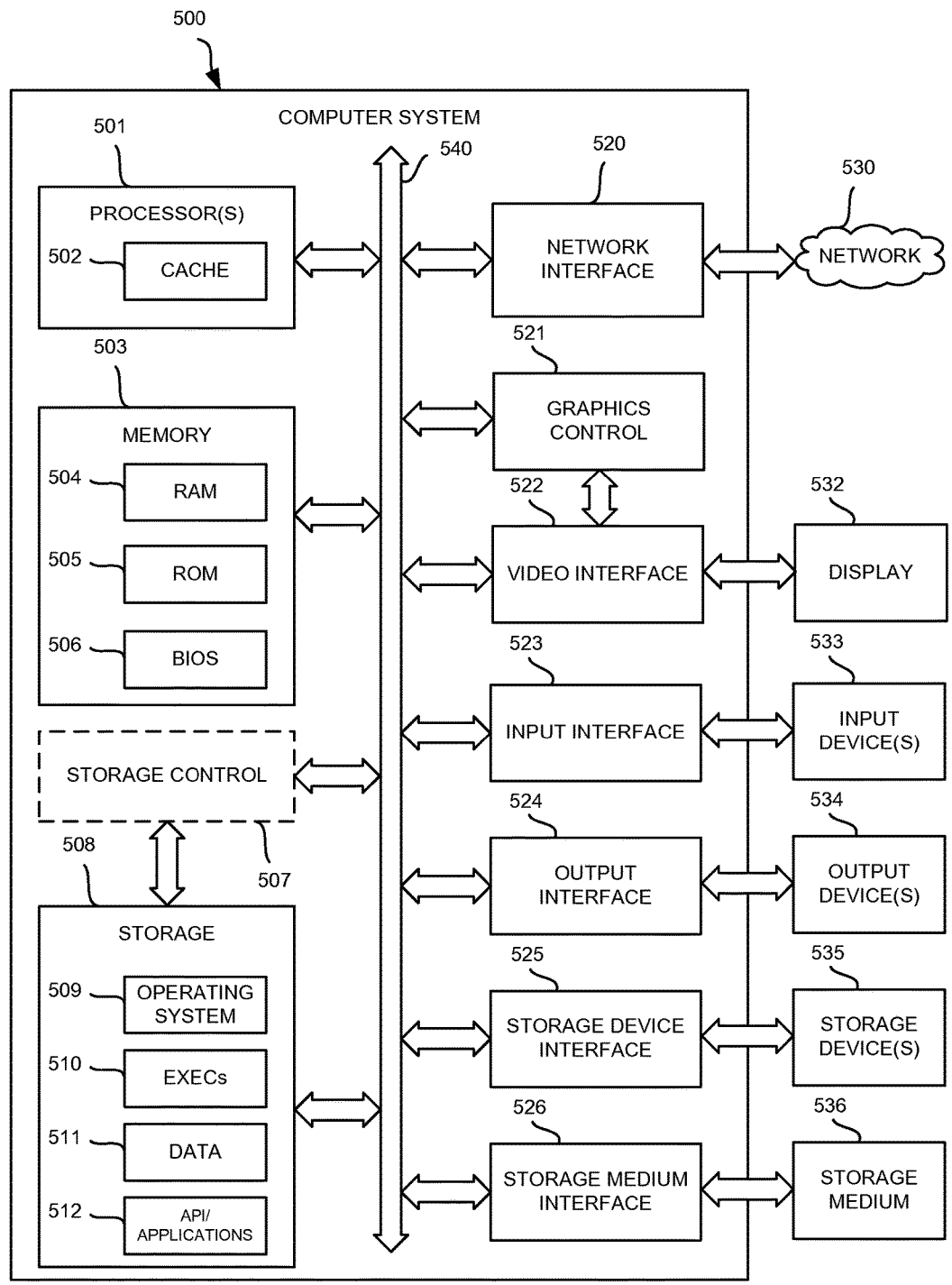
FIG. 5 shows a diagrammatic representation of one embodiment of a computer system 500 within which a set of instructions can execute for causing a device to perform or execute any one or more of the aspects and/or methodologies of the present disclosure.

The systems and methods described herein can be implemented in a computer system in addition to the specific physical devices described herein. FIG. 5 shows a diagrammatic representation of one embodiment of a computer system 500 within which a set of instructions can execute for causing a device to perform or execute any one or more of the aspects and/or methodologies of the present disclosure. The read/write device 301 in FIG. 3 is one implementation of the computer system 500. The components in FIG. 5 are examples only and do not limit the scope of use or functionality of any hardware, software, firmware, embedded logic component, or a combination of two or more such components implementing particular embodiments of this disclosure. Some or all of the illustrated components can be part of the computer system 500. For instance, the computer system 500 can be a general purpose computer (e.g., a laptop computer) or an embedded logic device (e.g., an FPGA), to name just two non-limiting examples.

Computer system 500 includes at least a processor 501 such as a central processing unit (CPU) or an FPGA to name two non-limiting examples. The memory controller section 311 in FIG. 3 is one implementation of the processor 501. The computer system 500 may also comprise a memory 503 and a storage 508, both communicating with each other, and with other components, via a bus 540. The bus 540 may also link a display 532, one or more input devices 533 (which may, for example, include a keypad, a keyboard, a mouse, a stylus, etc.), one or more output devices 534, one or more storage devices 535, and various non-transitory, tangible computer-readable storage media 536 with each other and with one or more of the processor 501, the memory 503, and the storage 508. All of these elements may interface directly or via one or more interfaces or adaptors to the bus 540. For instance, the various non-transitory, tangible computer-readable storage media 536 can interface with the bus 540 via storage medium interface 526. Computer system 500 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 501 (or central processing unit(s) (CPU(s))) optionally contains a cache memory unit 502 for temporary local storage of instructions, data, or computer addresses. Processor(s) 501 are configured to assist in execution of computer-readable instructions stored on at least one non-transitory, tangible computer-readable storage medium. Computer system 500 may provide functionality as a result of the processor(s) 501 executing software embodied in one or more non-transitory, tangible computer-readable storage media, such as memory 503, storage 508, storage devices 535, and/or storage medium 536 (e.g., read only memory (ROM)). For instance, one or more non-transitory, tangible computer-readable storage media can include code associated with the method 100 in FIG. 1, or the functional blocks of FIG. 2. The non-transitory, tangible computer-readable storage media may store software that implements particular embodiments, such as the method 100, and processor(s) 501 may execute the software. Memory 503 may read the software from one or more other non-transitory, tangible computer-readable storage media (such as mass storage device(s) 535, 536) or from one or more other sources through a suitable interface, such as network interface 520. The read/write device 301 can include a network interface 520 for communicating with other devices. The software may cause processor(s) 501 to carry out one or more processes or one or more steps of one or more processes described or illustrated herein. Carrying out such processes or steps may include defining data structures stored in memory 503 and modifying the data structures as directed by the software. In some embodiments, an FPGA can store instructions for carrying out functionality as described in this disclosure (e.g., the method 100 or the functionality of FIG. 2). In other embodiments, firmware includes instructions for carrying out functionality as described in this disclosure (e.g., the method 100 or the functionality of FIG. 2). In some embodiments, the non-volatile memory 208 and the non-volatile memory section 331 includes bootloader code, modem software, operating system code, file system code, and code to facilitate the implementation of one or more portions of the components discussed in connection with FIG. 2 as well as other components well known to those of ordinary skill in the art that are not depicted nor described in connection with FIG. 2 for simplicity.

The memory 503 may include various components (e.g., non-transitory, tangible computer-readable storage media) including, but not limited to, a random access memory component (e.g., RAM 504) (e.g., a static RAM "SRAM", a dynamic RAM "DRAM, etc.), a read-only component (e.g., ROM 505), and any combinations thereof. ROM 505 may act to communicate data and instructions unidirectionally to processor(s) 501, and RAM 504 may act to communicate data and instructions bidirectionally with processor(s) 501. ROM 505 and RAM 504 may include any suitable non-transitory, tangible computer-readable storage media described below. In some instances, ROM 505 and RAM 504 include non-transitory, tangible computer-readable storage media for carrying out the method 100. In one example, a basic input/output system 506 (BIOS), including basic routines that help to transfer information between elements within computer system 500, such as during start-up, may be stored in the memory 503.

Fixed storage 508 is connected bidirectionally to processor(s) 501, optionally through storage control unit 507. Fixed storage 508 provides additional data storage capacity and may also include any suitable non-transitory, tangible computer-readable media described herein. Storage 508 may be used to store operating system 509, EXECs 510 (executables), data 511, API applications 512 (application programs), and the like. For instance, the storage 508 could be implemented for storage of the read counter 334 or the last-erase timestamp 338 as described in FIG. 3. Often, although not always, storage 508 is a secondary storage medium (such as a hard disk) that is slower than primary storage (e.g., memory 503). Storage 508 can also include an optical disk drive, a solid-state memory device (e.g., flash-based systems), or a combination of any of the above. Information in storage 508 may, in appropriate cases, be incorporated as virtual memory in memory 503.

In one example, storage device(s) 535 may be removably interfaced with computer system 500 (e.g., via an external port connector (not shown)) via a storage device interface 525. Particularly, storage device(s) 535 and an associated machine-readable medium may provide nonvolatile and/or volatile storage of machine-readable instructions, data structures, program modules, and/or other data for the computer system 500. In one example, software may reside, completely or partially, within a machine-readable medium on storage device(s) 535. In another example, software may reside, completely or partially, within processor(s) 501.

Bus 540 connects a wide variety of subsystems. Herein, reference to a bus may encompass one or more digital signal lines serving a common function, where appropriate. Bus 540 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 500 may also include an input device 533. In one example, a user of computer system 500 may enter commands and/or other information into computer system 500 via input device(s) 533. Examples of an input device(s) 533 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 533 may be interfaced to bus 540 via any of a variety of input interfaces 523 (e.g., input interface 523) including, but not limited to, serial, parallel, game port, USB, FIREWIRE, THUNDERBOLT, or any combination of the above.

In particular embodiments, when computer system 500 is connected to network 530, computer system 500 may communicate with other devices, such as mobile devices and enterprise systems, connected to network 530. Communications to and from computer system 500 may be sent through network interface 520. For example, network interface 520 may receive incoming communications (such as requests or responses from other devices) in the form of one or more packets (such as Internet Protocol (IP) packets) from network 530, and computer system 500 may store the incoming communications in memory 503 for processing. Computer system 500 may similarly store outgoing communications (such as requests or responses to other devices) in the form of one or more packets in memory 503 and communicated to network 530 from network interface 520. Processor(s) 501 may access these communication packets stored in memory 503 for processing.

Examples of the network interface 520 include, but are not limited to, a network interface card, a modem, and any combination thereof. Examples of a network 530 or network segment 530 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 530, may employ a wired and/or a wireless mode of communication. In general, any network topology may be used.

Information and data can be displayed through a display 532. Examples of a display 532 include, but are not limited to, a liquid crystal display (LCD), an organic liquid crystal display (OLED), a cathode ray tube (CRT), a plasma display, and any combinations thereof. The display 532 can interface to the processor(s) 501, memory 503, and fixed storage 508, as well as other devices, such as input device(s) 533, via the bus 540. The display 532 is linked to the bus 540 via a video interface 522, and transport of data between the display 532 and the bus 540 can be controlled via the graphics control 521.

In addition to a display 532, computer system 500 may include one or more other peripheral output devices 534 including, but not limited to, an audio speaker, a printer, and any combinations thereof. Such peripheral output devices may be connected to the bus 540 via an output interface 524. Examples of an output interface 524 include, but are not limited to, a serial port, a parallel connection, a USB port, a FIREWIRE port, a THUNDERBOLT port, and any combinations thereof.

In addition or as an alternative, computer system 500 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a non-transitory, tangible computer-readable medium may encompass a circuit (such as an IC) storing software for execution, a circuit embodying logic for execution, or both, where appropriate. The present disclosure encompasses any suitable combination of hardware, software, or both.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Within this specification, the same reference characters are used to refer to terminals, signal lines, wires, etc. and their corresponding signals. In this regard, the terms "signal," "wire," "connection," "terminal," and "pin" may be used interchangeably, from time-to-time, within the this specification. It also should be appreciated that the terms "signal," "wire," or the like can represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein (e.g., the method 100) may be embodied directly in hardware, in a software module executed by a processor, a software module implemented as digital logic devices, or in a combination of these. A software module may reside in RAM memory, flash memory, ROM memory, EPROM memory, EEPROM memory, registers, hard disk, a removable disk, a CD-ROM, or any other form of non-transitory, tangible computer-readable storage medium known in the art. An exemplary non-transitory, tangible computer-readable storage medium is coupled to the processor such that the processor can read information from, and write information to, the non-transitory, tangible computer-readable storage medium. In the alternative, the non-transitory, tangible computer-readable storage medium may be integral to the processor. The processor and the non-transitory, tangible computer-readable storage medium may reside in an ASIC. The ASIC may reside in a user terminal. In the alternative, the processor and the non-transitory, tangible computer-readable storage medium may reside as discrete components in a user terminal. In some embodiments, a software module may be implemented as digital logic components such as those in an FPGA once programmed with the software module.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A FLASH memory device comprising:
   a plurality of memory blocks each having a metadata section;
   a FASTMAP memory block;
   a read counter module comprising:
      a counter module that increments a read counter value when a read operation is performed on a one of the plurality of memory blocks;
      a backup module that periodically copies the read counter value to the FASTMAP memory block;
      a reset module that resets the read counter value when an erase operation is performed on the one of the memory blocks;
   a last-erase timestamp module that updates a last-erase timestamp in a metadata section of the one of the memory blocks every time that an erase operation is performed on the one of the memory blocks;
   a move and erase module comprising:
      a read counter scrubbing scheduler that schedules data stored in the one of the memory blocks to be moved and then the one of the memory blocks to be erased when the read counter reaches a first threshold;
      a last-erase timestamp scrubbing scheduler that schedules data stored in the one of the memory blocks to be moved and then the one of the memory blocks to be erased when the last-erase timestamp exceeds a second threshold.

2. The system of claim 1, wherein the read counter is stored in a volatile memory of a read/write device coupled to the FLASH memory device.

3. The system of claim 2, wherein the FLASH memory device is an embedded memory device integrated with the read/write device.

4. The system of claim 1, wherein a user-space application triggers the last-erase timestamp scrubbing scheduler.

5. The system of claim 4, wherein the user-space application determines that the last-erase timestamp exceeds the second threshold.

6. The system of claim 1, wherein the pending scrub list is handled by an unsorted block images layer wear-leveling sub-system in a background thread.

7. A method comprising:
   incrementing a read counter every time that a read operation is performed on a memory block of a FLASH memory;
   periodically making a copy of the read counter in a FASTMAP block of the FLASH memory; wherein the read counter is stored in a volatile memory of a read/write device coupled to the FLASH memory;
   resetting the read counter when an erase operation is performed on the memory block;
   updating a last-erase timestamp whenever the memory block is erased, the updating occurring in a metadata of the memory block of the FLASH memory; and
   scheduling the memory block for a move and erase operation when either:
      the read counter reaches a read count threshold; or
      the last-erase timestamp reaches a last-erase threshold; and
   identifying an invalid read counter in the FASTMAP block and, in response, reading a default value for the read counter into the volatile memory.

8. The method of claim 7, wherein, the default value is 0 where the memory block is a memory block that has data written to it.

9. The method of claim 8, wherein, wherein the default value is half of the first threshold where the memory block is a memory block that has data written to it.

10. The method of claim 8, wherein, wherein the default value is an average of the last-erase timestamp for the memory block and all other last-erase timestamps in the FLASH memory device where the memory block is a memory block that has data written to it.

11. The method of claim 7, wherein determining if the last-erase timestamp reaches a time since a second threshold is calculated using the following relationship: last-erase timestamp+an erase time limit<a current time.

12. A non-transitory, tangible computer readable storage medium, encoded with processor readable instructions to perform a method for reducing read disturb and data retention errors in FLASH memory, the method comprising:
   incrementing a read counter every time that a read operation is performed on a memory block of a FLASH memory;
   periodically making a copy of the read counter in a FASTMAP block of the FLASH memory;
   resetting the read counter when an erase operation is performed on the memory block;
   updating a last-erase timestamp whenever the memory block is erased, the updating occurring in a metadata of the memory block of the FLASH memory; and
   scheduling the memory block for a move and erase operation when either:
      the read counter reaches a read count threshold; or
      the last-erase timestamp reaches a last-erase threshold; and
   identifying an invalid read counter in the FASTMAP block and, in response, reading a default value for the read counter into a volatile memory.

13. The method of claim 12, wherein the read counter is stored in a volatile memory of a read/write device coupled to the FLASH memory device.

14. The method of claim 12, wherein, the default value is 0 where the memory block is a memory block that has data written to it.

15. The method of claim 14, wherein, wherein the default value is half of the first threshold where the memory block is a memory block that has data written to it.

16. The method of claim 15, wherein, wherein the default value is an average of the last-erase timestamp for the memory block and all other last-erase timestamps in the FLASH memory device where the memory block is a memory block that has data written to it.

17. A system comprising:
  means for incrementing a read counter every time that a read operation is performed on a memory block of a FLASH memory;
  means for periodically making a copy of the read counter in a FASTMAP block of the FLASH memory;
  means for resetting the read counter when an erase operation is performed on the memory block;
  means for updating a last-erase timestamp whenever the memory block is erased, the updating occurring in a metadata of the memory block of the FLASH memory; and
  means for scheduling the memory block for a move and erase operation when either:
    the read counter reaches a read count threshold; or
    a sum of the last-erase timestamp and an erase time limit is less than a current time.

\* \* \* \* \*